Figure 1:
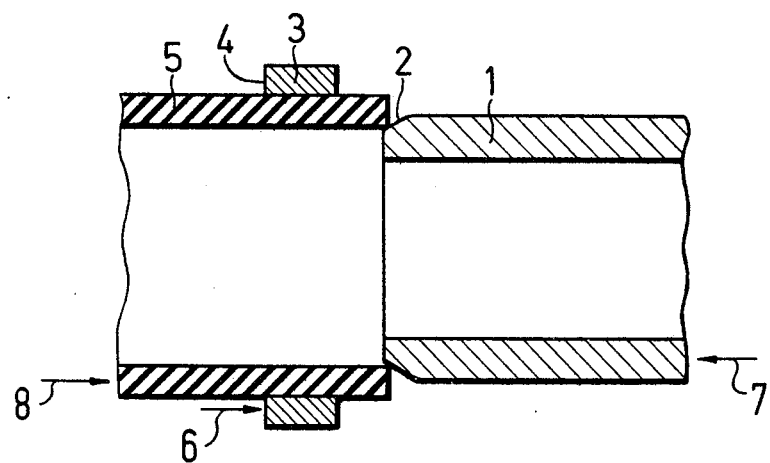

United States Patent [19]
Dunz

[11] 3,938,237

[45] Feb. 17, 1976

[54] METHOD OF SECURING TUBULAR BELLOWS TO A CYLINDER

[75] Inventor: Erwin Dunz, Schweinfurt am Main, Germany

[73] Assignee: Fichtel & Sachs AG, Schweinfurt am Main, Germany

[22] Filed: July 17, 1974

[21] Appl. No.: 489,387

[30] Foreign Application Priority Data

Aug. 7, 1973 Germany............................ 2339838

[52] U.S. Cl. ................... 29/450; 29/525; 285/242; 403/223
[51] Int. Cl.² ........................................ B23P 11/02
[58] Field of Search ..... 29/450 X, 451, 525, 235 X, 29/506; 285/255, 242 X; 403/223 X

[56] References Cited
UNITED STATES PATENTS

| | | | |
|---|---|---|---|
| 2,572,215 | 10/1951 | Swart............................... | 29/235 X |
| 2,713,713 | 7/1955 | Tubbs............................ | 29/451 UX |
| 2,765,580 | 10/1956 | Herrschaft..................... | 403/233 X |
| 2,880,991 | 4/1959 | Ward............................. | 403/223 X |
| 3,176,388 | 4/1965 | Dutton............................ | 29/450 |

FOREIGN PATENTS OR APPLICATIONS

| | | | |
|---|---|---|---|
| 1,073,572 | 9/1954 | France.............................. | 285/242 |
| 1,093,152 | 11/1960 | Germany........................... | 285/255 |
| 89,804 | 11/1958 | Netherlands....................... | 285/242 |

*Primary Examiner*—Charlie T. Moon
*Attorney, Agent, or Firm*—Hans Berman

[57] ABSTRACT

A yieldably resilient, tubular bellows is fastened to a metal cylinder by first inserting an axial end portion of the bellows in a more rigid clamping ring whose internal cross section is greater than the cross section of the cylinder, but not substantially greater than that of the outer cross section of the bellows, then axially juxtaposing the bellows and the cylinder, and exerting axial pressure in opposite directions on the ring and the cylinder while preventing the bellows from moving out of the ring until an axially terminal portion of the cylinder enters the bore of the bellows, smaller in cross section than the cylinder, and is axially coextensive with the ring, whereby the bellows is radially compressed between the ring and the cylinder.

10 Claims, 2 Drawing Figures

METHOD OF SECURING TUBULAR BELLOWS TO A CYLINDER

This invention relates to the fastening of a resilient tubular body to a more rigid cylindrical body, and particularly to the fastening of a tubular body to a cylinder inserted in the bore of the tubular body by a clamping ring axially coextensive with respective axial portions of the tubular body and of the cylinder.

The invention will be described hereinbelow with reference to the fastening of a bellows of elastomeric material on a cylindrical metal part of a telescopic shock absorber of the type more fully described and illustrated in the commonly owned Vers U.S. Pat. No. 3,744,123.

It has been shown in the earlier patent that a tubular bellows may be secured to an inserted metal cylinder by enveloping the bellows with a clamping ring, and thereafter deforming the ring until it presses the bellows against the inserted cylinder. The force required for deforming the ring is relatively great, and substantial skill is required on the part of an operator if unintentional deformation of the metallic cylinder is to be avoided, as is necessary for proper functioning of a cylinder in a shock absorber.

It is an object of this invention to provide a method of securing a yieldably resilient tubular body to a cylindrical body more rigid than the tubular body which requires less skill without hazard of deformation of the cylindrical body.

With this object and others in view, as will hereinafter become apparent, the invention is more specifically concerned with the securing of a yieldably resilient first body to a second, cylindrical body, wherein the bodies have respective axes and the first body is formed with an axial bore of smaller cross section in the relaxed condition of the first body than the cross section of the second body. The first body is inserted in a more rigid clamping ring whose internal cross section is greater than the cross section of the cylindrical body, but not substantially greater than the outer cross section of the tubular body. The two bodies then are axially juxtaposed, and axial pressure is exerted in opposite respective directions on the ring and the cylindrical body while the tubular body is prevented from moving out of the ring, until an axially terminal portion of the cylindrical body enters the bore of the tubular body and is axially coextensive with the ring, whereby the tubular body is radially compressed between the ring and the cylindrical body.

Figure 2:
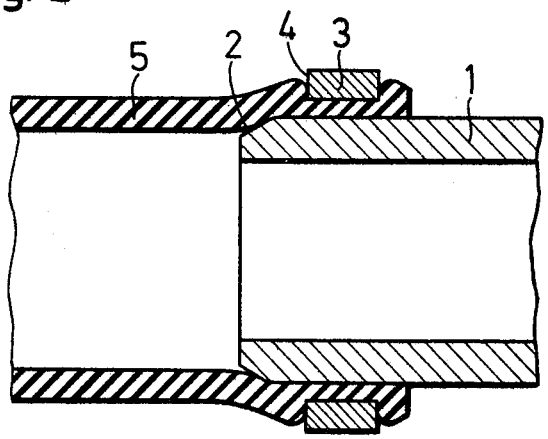

Other features, additional objects, and many of the attendant advantages of this invention will readily be appreciated as the same becomes better understood by reference to the following description of a preferred embodiment when considered in connection with the appended drawing in which:

FIG. 1 shows the elements to be secured to each other by the method of the invention in fragmentary axial section at an intermediate stage of the securing operation; and FIG. 2 illustrates the elements of FIG. 1 in the fully secured condition.

Referring first to FIG. 1, there is shown only as much of the cylinder 1 of a telescopic, automotive shock absorber as is needed for an understanding of the invention, only the axial wall of the cylinder 1 being shown in order not to crowd the drawing. The annular outer edge 2 at the axial end of the cylinder 1 is beveled conically so that the cylinder wall tapers toward its end. In the position shown in FIG. 1, the conical outer face of the cylinder 1 engages the inner wall of a rubber bellows 5 whose illustrated portion is a hollow cylinder of uniform outer and inner cross section in the relaxed condition of FIG. 1.

In an operation preceding the condition illustrated in FIG. 1, the bellows 5 was axially inserted in a metal ring 3 of hollow cylindrical shape whose inner diameter is approximately equal to the outer diameter of the bellows 5 in the relaxed condition of the latter and greater than the external diameter of the cylinder 1 which in turn is greater than the diameter of the cylindrical bore in the bellows 5. Prior to insertion of the bellows 5, the inner cylindrical surface of the ring 3 was roughened, as by sandblasting, and coated with a liquid adhesive composition so that the ring 3 was axially secured on the bellows 5 in the condition of FIG. 1 in which the axially terminal portion of the bellows 5 projects beyond the ring 3 toward the juxtaposed cylinder 1.

Pressure then was exerted in opposite axial directions on the ring 3 and the cylinder 1, as indicated respectively by arrows 6, 7. The beveled leading edge 2 of the cylinder 1 first entered the bore of the bellows 5, thereby expanding the orifice of the bellows and clamping the bellows wall between the leading edge 2 and the adjacent inner edge of the ring 3. In combination with the roughening of the inner ring surface and the adhesive bond between the radially engaged annular surfaces of the ring 3 and the bellows 5, the clamping action of the beveled edge 2 prevented the bellows 5 from slipping out of the ring 3 while the cylinder 1 entered the bore of the bellows 5 until ultimately the condition of FIG. 2 was reached in which the cylinder 1 projects beyond the ring 3 inward of the bellows 5. Further to avoid all relative axial movement of the ring 3 and the bellows 5, axial force was exerted on the latter as indicated by an arrow 8.

When the bellows 5 is assembled with the cylinder, as is shown in FIG. 2, the ring 3 is axially coextensive with respective parts of the bellows 5 and of the cylinder 1. A portion of the bellows is compressed between the ring 3 and the cylinder 1, and the bellows material resiliently displaced by compression forms beads along the axially spaced radial surfaces of the ring 3.

The energy expended in forcing the cylinder 1 into the bore of the bellows 5 is partly stored in the deformed bellows material and partly converted to heat. It may be provided by the hands of an operator pressing the ring 3 and the cylinder 1 toward each other. Alternatively, the cylinder 1 may be placed upright on a fixed support, such as a workbench, so that both hands of the operator are available for exerting pressure on the ring 3 (arrow 6) and exerting an axial force on the bellows 5 (arrow 8). It is usually more convenient to employ a press having one apertured platen dimensioned for passage of the bellows 5, but abuttingly engaging the face 4 of the ring which is directed away from the axially juxtaposed cylinder 1, while the other press platen is brought to bear on the axial end of the cylinder 1 omitted from the drawing.

Neither the ring 3 nor the cylinder 1 is deformed during the afore-described operation, and the forces axially applied need only be sufficient to cause the required deformation of the elastomeric bellows material. The beveled edge 2 of the cylinder 1 prevents damage to the bellows 5 during the assembly operation and thereafter during normal use of the assembled apparatus. At least some of the effect of the beveled edge 2 may alternatively be achieved by providing the orifice of the bellows 5 with a beveled inner edge.

It is preferred to maintain an initially selected axial position of the ring 3 on the bellows 5 during subsequent introduction of the cylinder 1 by a combination of factors enumerated above. However, depending on the dimensional relationship of the ring 3, the bellows 5, and the cylinder 1, on the elastic modulus of the bellows material, and other process variables, the several steps enumerated above for preventing movement of the bellows 5 out of the ring 3 during introduction of the cylinder 1 may be relied upon individually or in combinations not including all the features jointly applied in the illustrative example of the invention. Thus, the direct frictional engagement of the sand-blasted inner ring face with the outer surface of the bellows may suffice.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. A method of securing a yieldably resilient first body to a second cylindrical body more rigid than said first body, said bodies having respective axes, and said first body being formed with an axial bore therethrough of smaller cross section in the relaxed condition of said first body than the cross section of said second body, which method comprises:
    a. inserting said first body in a clamping ring more rigid than said first body;
        1. the internal cross section of said ring being greater than said cross section of said second body, but not substantially greater than the outer cross section of said first body,
        2. said first body being inserted into said ring until an axially terminal portion of said first body projects beyond said ring,
        3. said portion of said first body being formed with an orifice of said bore, and said second body entering said orifice under said exerted axial pressure;
    b. axially juxtaposing said bodies; and
    c. exerting axial pressure in opposite respective directions on said ring and on said second body while preventing said first body from moving out of said ring, until an axially terminal portion of said second body enters said bore and is axially coextensive with said ring, whereby a portion of said first body is radially compressed between said ring and said second body.

2. A method as set forth in claim 1, wherein said axially terminal portion of said second body has a beveled leading edge first engaging said first body during said entering.

3. A method as set forth in claim 1, wherein said axial pressure is exerted on a radial face of said ring directed away from said second body while said bodies are axially juxtaposed.

4. A method as set forth in claim 3, wherein said first body is prevented from moving out of said ring during said exerting of axial pressure by frictional engagement between said first body and said ring.

5. A method as set forth in claim 3, wherein said first body is prevented from moving out of said ring until said portion of said second body enters said bore by exerting axial force on said first body in a direction toward said second body.

6. A method as set forth in claim 3, wherein said first body is prevented from moving out of said ring during said exerting of axial pressure by adhesively fastening said ring to said first body prior to said exerting.

7. A method as set forth in claim 1, wherein said projecting axially terminal portion of said first body is prevented from moving inward of said ring during said exerting of axial pressure.

8. A method as set forth in claim 7, wherein said axial pressure is exerted until said axially terminal portion of said second body projects from said bore in an axial direction away from the axially terminal portion of said first body, whereby respective annular parts of said first body are coextensive with respective parts of said second body and axially offset from said ring in respective opposite axial directions, and the outer diameter of said annular parts is greater than the outer diameter of said compressed portion.

9. A method as set forth in claim 8, wherein said annular parts and said compressed portion, when in the relaxed condition, have outer faces of the same cross section and inner faces of the same cross section.

10. A method as set forth in claim 9, wherein said outer and inner faces are cylindrical.

* * * * *